UNITED STATES PATENT OFFICE.

ARTHUR P. AYLING, OF MILWAUKEE, WISCONSIN.

COMPOSITION FOR MANUFACTURING GLASS.

SPECIFICATION forming part of Letters Patent No. 522,001, dated June 26, 1894.

Application filed February 8, 1894. Serial No. 499,456. (No specimens.)

*To all whom it may concern:*

Be it known that I, ARTHUR P. AYLING, of Milwaukee, in the county of Milwaukee and State of Wisconsin, have invented certain new and useful Improvements in Composition for the Manufacture of Glass; and I do hereby declare that the following is a full, clear, and exact description of the invention, which will enable others skilled in the art to which it pertains to make and use the same.

The main objects of my invention are to produce what is generally known in glass manufacture as German green glass, to utilize for the purpose, waste or inexpensive materials and to produce a strong, tough metal suitable for bottles, battery jars, electric insulators, &c., and generally to improve the quality of glass for such articles.

It consists of the composition of matter hereinafter particularly described and pointed out in the claims.

For the batch, I take clay, preferably in the form of pulverized or broken brick, ordinary sand, such as is commonly used in the manufacture of glass, and salt-cake (sodium sulphate), which is a by-product of the manufacture of hydrochloric acid, in about the following proportions by weight: one hundred parts of clay or broken brick, one hundred parts of sand and forty parts of salt-cake. The mixture composing the batch is then melted in the ordinary manner in crucibles or tank furnaces such as are commonly used for the purpose. A metal is thus produced which can be easily and economically worked and will produce glass of a uniform unvariable green and of superior strength and quality.

Heretofore it has been found difficult, if not impossible, in this country to produce with certainty, from inexpensive materials at least, the color known as German green, which is desirable for certain purposes such as the manufacture of certain kinds of bottles. With my improved composition as above described, the desired color can be invariably obtained. By varying the proportions of the ingredients, different shades of green can be produced, but if the quantity of sand is increased, the salt-cake, which serves as a flux, should be correspondingly increased. I prefer, however, to employ the several materials in about the proportions above stated, as I have found by experience that they give uniformly satisfactory, if not the best results.

The clay which I have thus far employed is such as is found in the vicinity of Milwaukee, Wisconsin, from which Milwaukee cream colored brick are made, but I do not wish to limit myself to this special variety of clay, as other kinds may serve the purpose equally well. Imperfect and broken brick made from suitable kinds of clay, are preferable when they can be had, because they are in better condition than the clay for melting. In places where brick are made extensively, sufficient quantities of such waste material can be had for little or nothing.

Inasmuch as all of the materials entering into my composition are usually obtainable as waste products, glass can be made therefrom very cheaply and of excellent quality.

I claim—

1. A composition for the manufacture of glass, consisting of clay, sand and salt-cake, substantially as and for the purposes set forth.

2. A composition for the manufacture of glass, consisting of about one hundred parts by weight, of sand, one hundred parts by weight, of clay, and forty parts by weight, of salt-cake, substantially as and for the purposes set forth.

3. A composition for the manufacture of glass, consisting of about equal portions by weight, of sand and broken or pulverized clay brick, and of about one-fifth by weight, of salt-cake, substantially as and for the purposes set forth.

In testimony that I claim the foregoing as my own I affix my signature in presence of two witnesses.

ARTHUR P. AYLING.

Witnesses:
CHAS. L. GOSS,
M. L. EMERY.